(12) United States Patent
Nishioka

(10) Patent No.: US 6,652,300 B2
(45) Date of Patent: Nov. 25, 2003

(54) CARD CONNECTOR DEVICE HAVING SLIDE MEMBER FOR DISCHARGING CARD

(75) Inventor: Toru Nishioka, Miyagi-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 0 days.

(21) Appl. No.: 10/098,927

(22) Filed: Mar. 15, 2002

(65) Prior Publication Data

US 2002/0142638 A1 Oct. 3, 2002

(30) Foreign Application Priority Data

Apr. 2, 2001 (JP) ........................................ 2001-103572

(51) Int. Cl.[7] ................................................. H01R 13/62
(52) U.S. Cl. ........................................ 439/159; 439/188
(58) Field of Search ................................ 439/152–156, 439/158–160, 630–634, 188

(56) References Cited

U.S. PATENT DOCUMENTS

| | | | | |
|---|---|---|---|---|
| 5,857,857 A | | 1/1999 | Fukuda | 439/188 |
| 5,899,763 A | * | 5/1999 | Kajiura | 439/159 |
| 6,126,464 A | | 10/2000 | Chang | 439/188 |
| 6,270,365 B1 | * | 8/2001 | Nishioka | 439/159 |
| 6,319,029 B2 | * | 11/2001 | Nishioka | 439/159 |
| 6,379,167 B1 | * | 4/2002 | Zhang et al. | 439/157 |
| 6,390,836 B1 | * | 5/2002 | Motegi et al. | 439/159 |
| 6,398,567 B1 | * | 6/2002 | Nishimura | 439/159 |

* cited by examiner

*Primary Examiner*—Hien Vu
(74) *Attorney, Agent, or Firm*—Beyer Weaver & Thomas

(57) ABSTRACT

A lock member has an engagement receiving portion to be engaged with an engaging portion formed in a slide member. An engagement regulating portion is provided so as to regulate the movement in the disengaging direction of the slide member and the lock member in a state in which the engaging portion and the engagement receiving portion are engaged. By removing the regulation by the engagement regulating portion, the engaging portion and the engagement receiving portion are disengaged from each other.

3 Claims, 13 Drawing Sheets

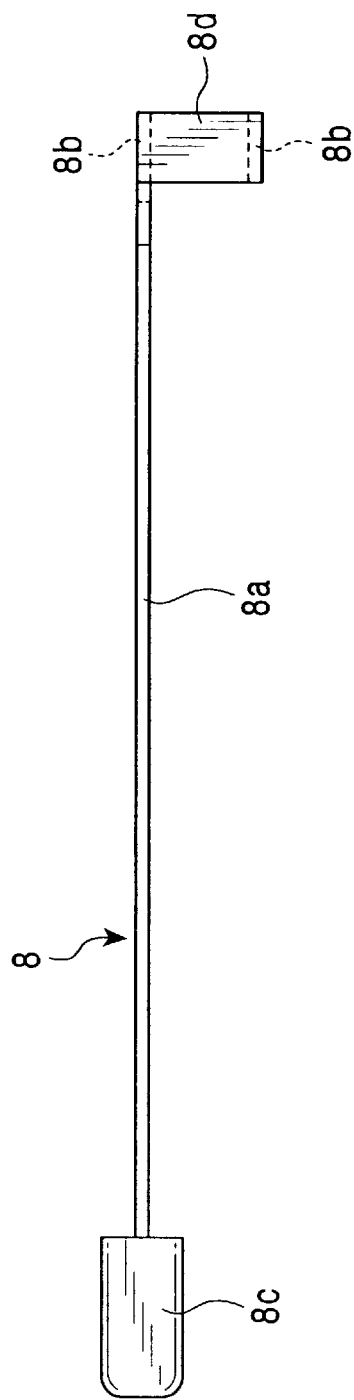
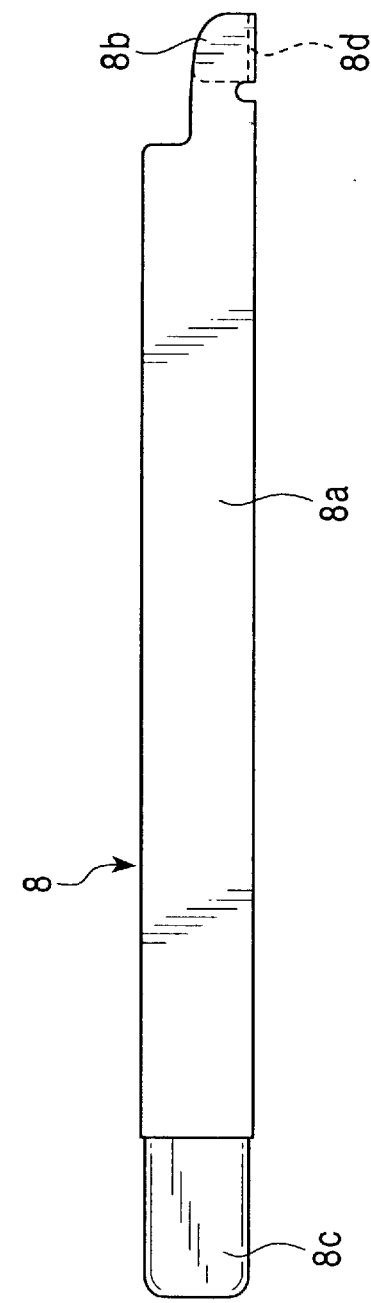

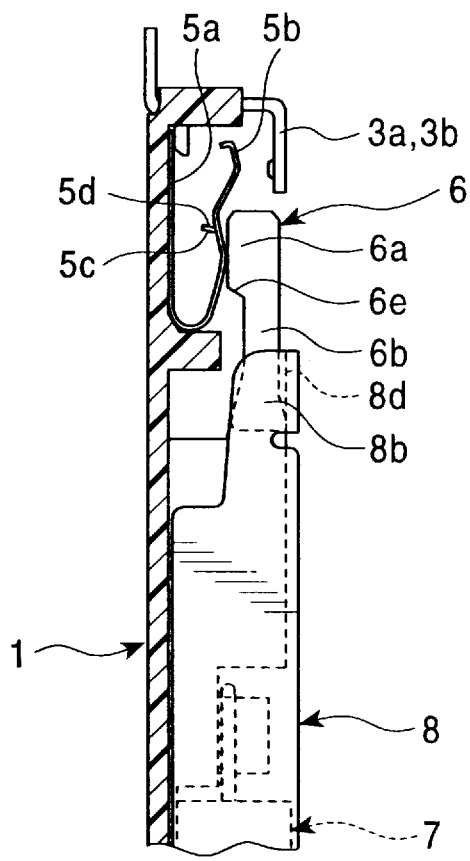
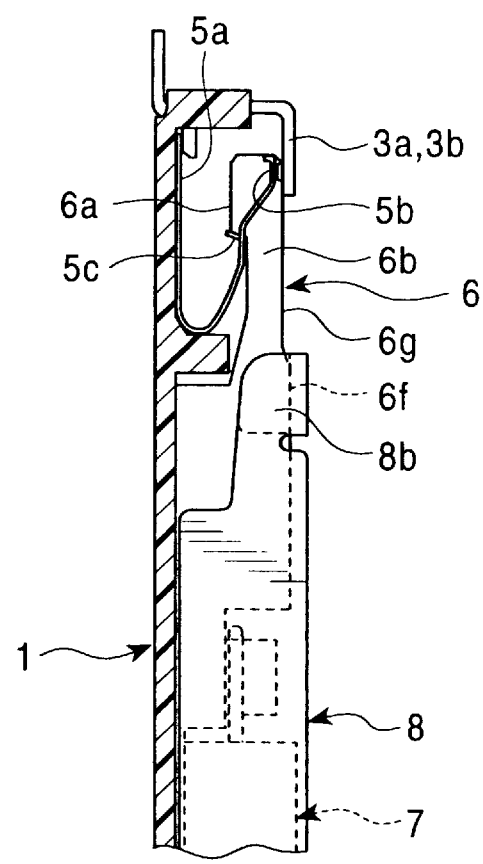

CARD CONNECTOR DEVICE HAVING SLIDE MEMBER FOR DISCHARGING CARD

BACKGROUND OF THE INVENTION

1. Field of the Invention

The present invention relates to the configuration of a card connector device used for IC cards serving as storage media in personal computers, CF (compact flash) cards used in electronic devices, such as digital cameras, and other cards.

2. Description of the Related Art

IC card connectors are generally used as additional storage devices for personal computers, and IC cards have been widely used as recording media for the IC card connectors.

An IC card is loaded into an IC card connector, and necessary information is written on and read from the IC card. In order to enhance the ease of loading and unloading the IC card, some IC card connectors have a discharging mechanism for discharging an IC card, and a lock member for locking the IC card in a loading position. Further, some IC card connectors read and write data from and onto an IC card after it is detected that the IC card is locked in the loading position, in order to precisely perform the reading and writing operations.

The above related IC card connectors also have a slide member which moves in a card-inserting direction and a card-discharging direction in response to the loading and unloading of the IC card. The slide member has an engaging arm which engages with an engaging portion of the IC card in response to the loading and unloading of the IC card. When the IC card is inserted, the slide member is moved in the card-inserting direction in response to the movement of the IC card.

Also, known IC card connectors include a lock member for holding a slide member in a loading position of an IC card, a pushrod for unlocking the lock member, and a spring member for urging the slide member in the card-discharging direction when the lock member is unlocked. When the IC card is discharged by the movement of the slide member in the card-discharging direction, it is pushed in that direction by the urging force of the spring member.

A known type of IC-card lock detection mechanism includes a detection switch disposed inside a housing. When the detection switch is pressed by an IC card, which is inserted into the housing and is locked in the loading position, it is detected that the IC card has been locked in the loading position.

In the above-described IC card connector devices, the lock member is made of an elastic metal plate, and a cutout formed in the metal plate is engaged with an engaging portion of the slide member. When the lock member is bent by the pushrod so as to disengage from the slide member, since a strong urging force in the card-discharging direction of the spring member acts on the slide member, the leading end of the engaging portion of the slide member becomes gradually worn down and rounded by repeating disengaging operations. As a result, the slide member cannot be held in the loading position.

SUMMARY OF THE INVENTION

Accordingly, the present invention aims to overcome the above problems, and an object of the invention is to provide a card connector device having a highly durable lock mechanism in which a card can be reliably held in a loading position.

In order to achieve the above object, according to an aspect of the present invention, there is provided a card connector device including a slide member which slides in directions of insertion and discharging of a card to be loaded in and unloaded from a housing, a return spring for urging the slide member in the card-discharging direction, a lock member for holding the slide member at a position, where the card is loaded, against the urging force of the return spring, and a releasing member for unlocking the held lock member. The lock member has an engagement receiving portion to be engaged with an engaging portion of the slide member. An engagement regulating portion is provided to regulate the movement of the slide member and the lock member in a disengaging direction in a state in which the engaging portion and the engagement receiving portion are engaged with each other. The engaging portion and the engagement receiving portion are disengaged by removing the regulation by the engagement regulating portion.

In this case, the engagement regulating portion allows a reliable lock operation. Moreover, since the engagement between the engaging portion and the engagement receiving portion can be loosened, the durability of the lock mechanism can be increased.

Preferably, the engaging portion and the engagement receiving portion have an inclined face which allows the slide member to slide in the card-discharging direction. When the regulation by the engagement regulating portion is removed, the engaging portion slides upward on the inclined face, and disengages from the engagement receiving portion.

Even when card discharging operation is repeated, the leading ends of the engaging portion and the engagement receiving portion will not be worn down and rounded due to sliding, and locking operation can be reliably performed. Consequently, the structure of the lock mechanism is simplified, and the durability thereof is increased.

Preferably, the releasing member for unlocking the slide member is formed of a pushrod which slides in the card-inserting direction. The slide member and the lock member are disengaged by removing the regulation by the engagement regulating portion at the push of the pushrod. Consequently, the locking can be released by simply pushing the pushrod.

Preferably, the pushrod has the engagement regulating portion, and the slide member has a first regulating face portion which contacts the engagement regulating portion so as to regulate the upward movement of the engaging portion, and a second regulating face portion which is different in height from the first regulating face portion and allows the upward movement of the engaging portion.

In this case, the lock mechanism with a simple structure is achieved without adding other components, and the locking can be released by simply pushing the pushrod.

Preferably, the lock member is made of an elastically deformable metal plate. When the lock member is pressed by pushing the pushrod, the engagement receiving portion is bent in a direction such as to disengage from the slide member. Consequently, the structure is simplified, and the engaging and disengaging operations can be easily performed.

Further objects, features and advantages of the present invention will become apparent from the following description of the preferred embodiments with reference to the attached drawings.

BRIEF DESCRIPTION OF THE DRAWINGS

FIG. 11 is a plan view of a pushrod in the present invention;

FIG. 12 is a side view of the pushrod;

FIG. 21 is an explanatory view showing a state in which the detection switch section is in an OFF state during the insertion of the card;

FIG. 22 is an explanatory view showing a locked state in which the slide member is engaged with the lock member;

DESCRIPTION OF THE PREFERRED EMBODIMENTS

Figure 1:
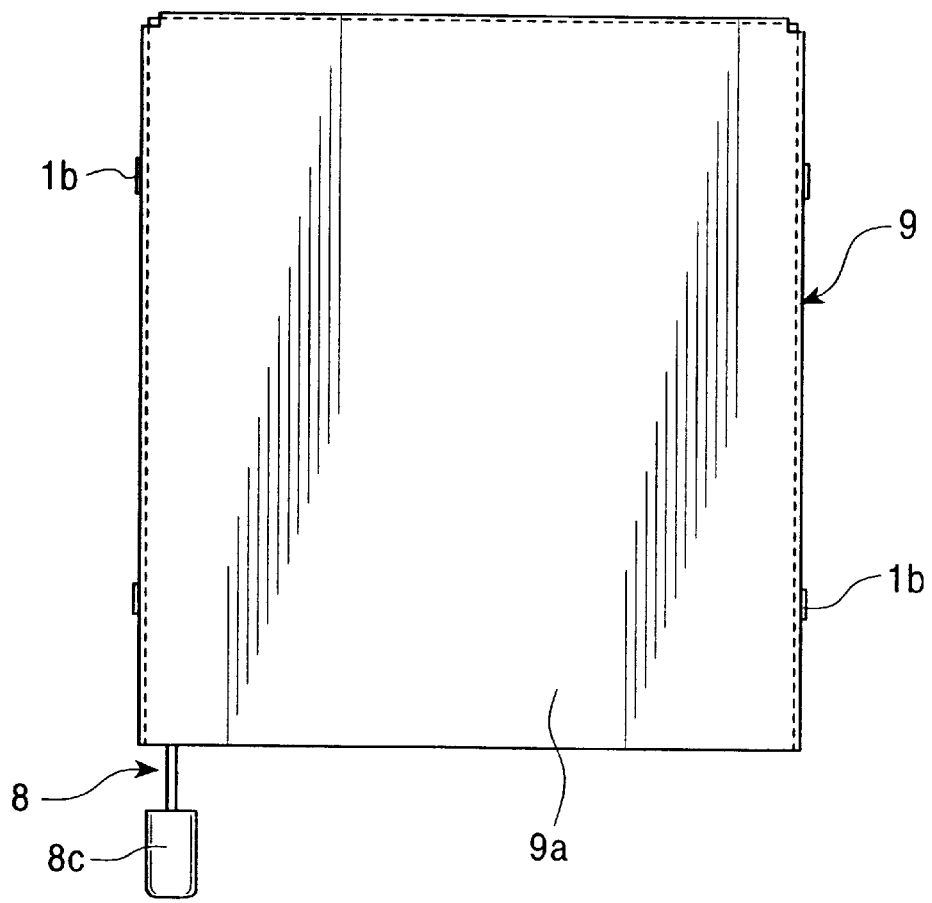
FIG. 1 is a plan view of a card connector device according to an embodiment of the present invention.
Figure 2:
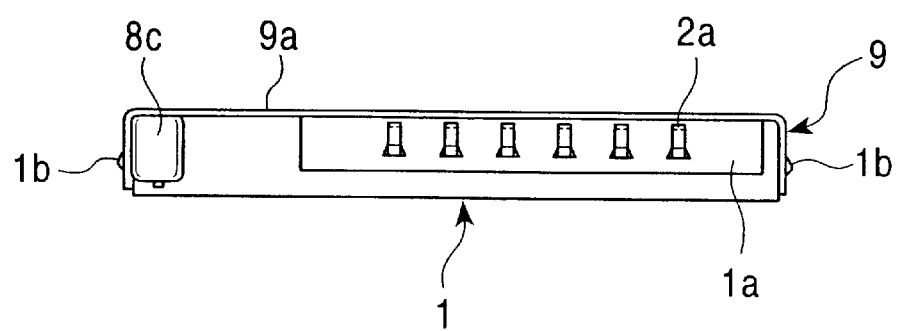
FIG. 2 is a front view of the card connector device.
Figure 3:
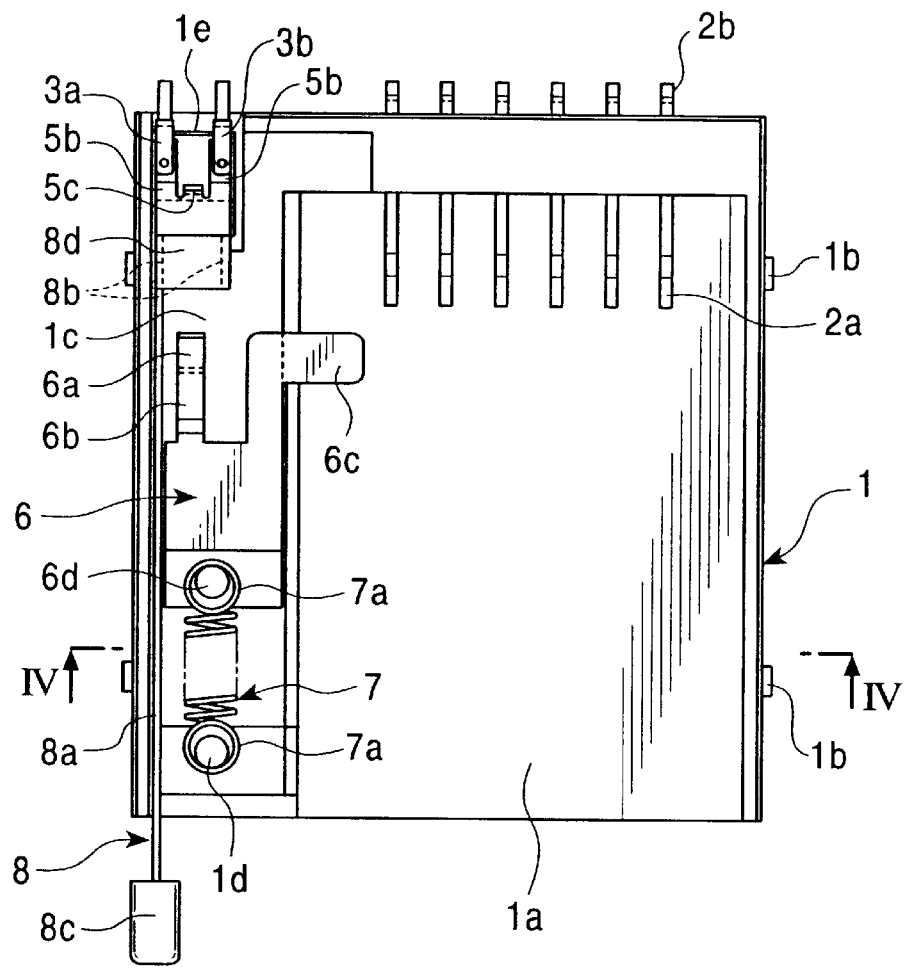
FIG. 3 is a plan view of the card connector device from which a cover is removed.
Figure 4:
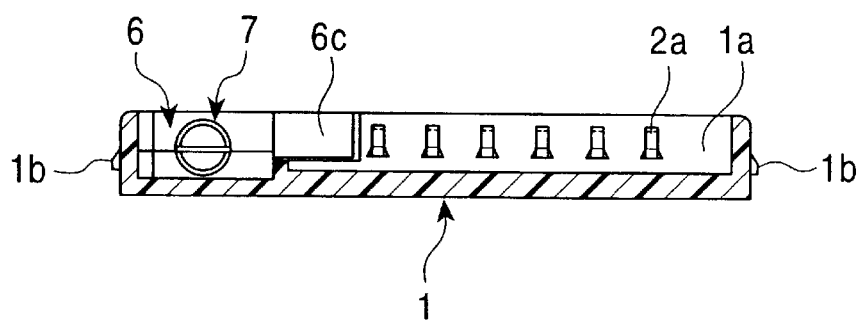
FIG. 4 is a sectional view taken along line IV—IV in FIG. 3.
Figure 5:
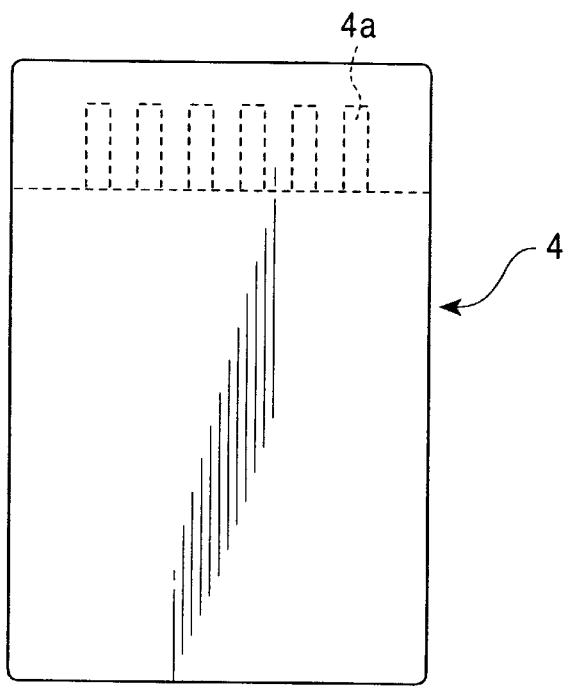
FIG. 5 is a plan view of a card in the present invention.
Figure 6:
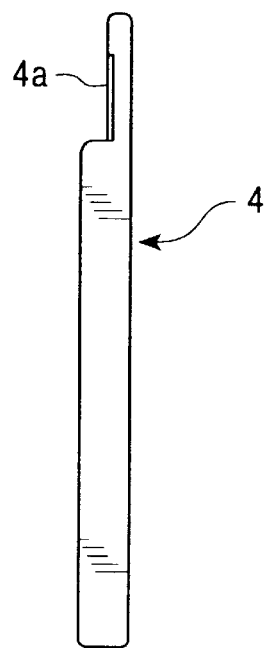
FIG. 6 is a side view of the card.
Figure 7:
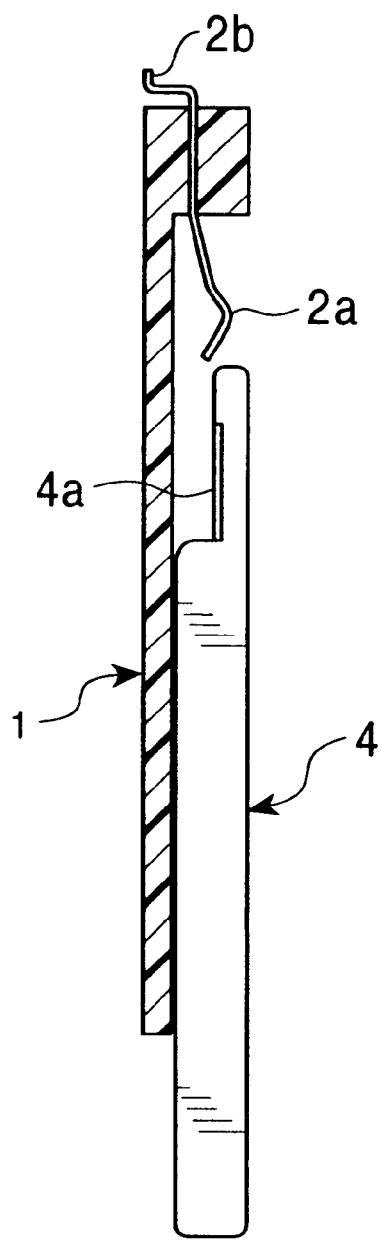
FIG. 7 is an explanatory view showing a connecting state with contact terminals before a card is inserted in the present invention.
Figure 8:
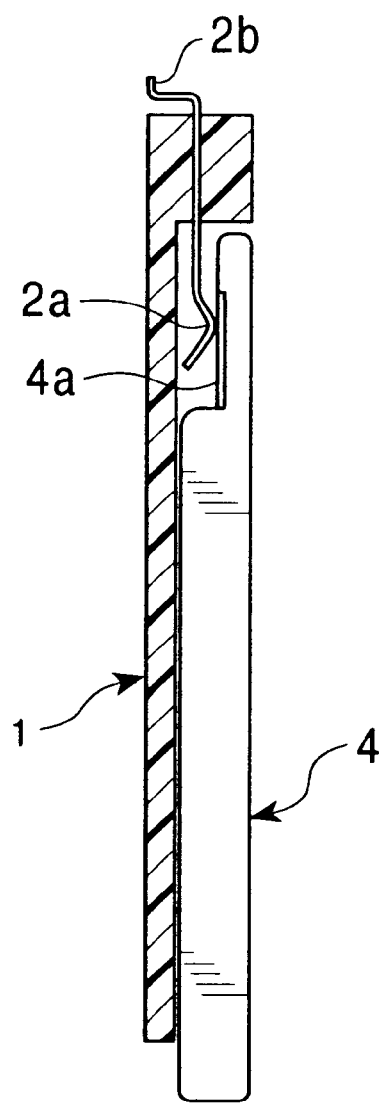
FIG. 8 is an explanatory view showing a connecting state with the contact terminals in which the card is loaded.
Figure 9:
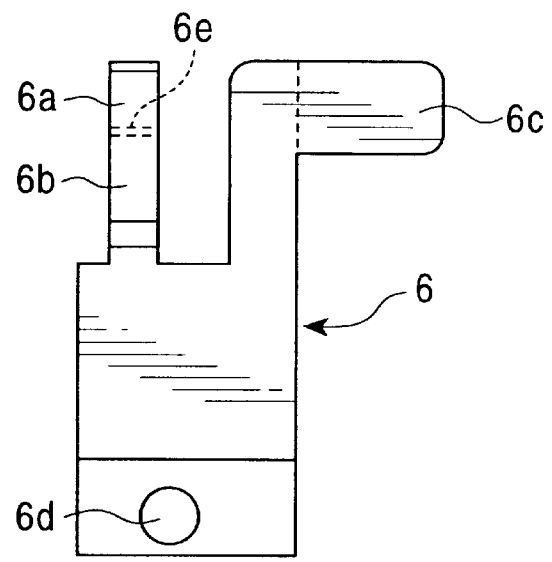
FIG. 9 is a front view of a slide member in the present invention.
Figure 10:
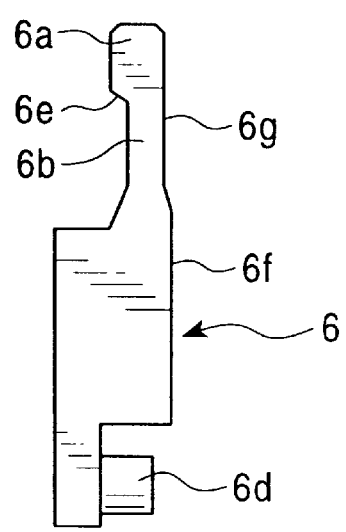
FIG. 10 is a side view of the slide member.
Figure 13:
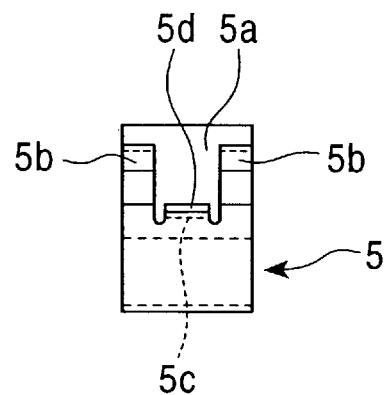
FIG. 13 is a plan view of a lock member in the present invention.
Figure 14:
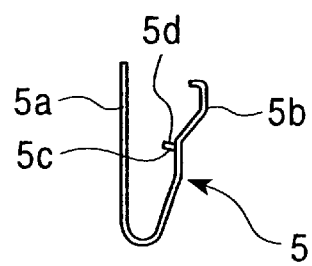
FIG. 14 is a side view of the lock member.
Figure 15:
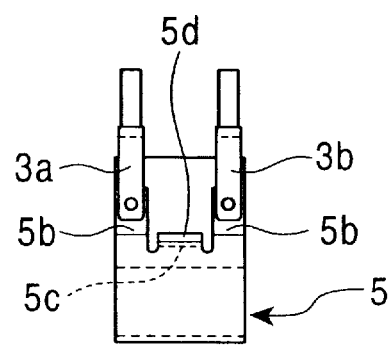
FIG. 15 is a plan view of a detection switch section in the present invention.
Figure 16:
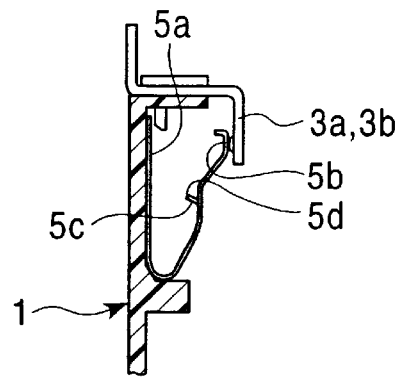
FIG. 16 is a sectional view of the detection switch section mounted in a housing.
Figure 17:
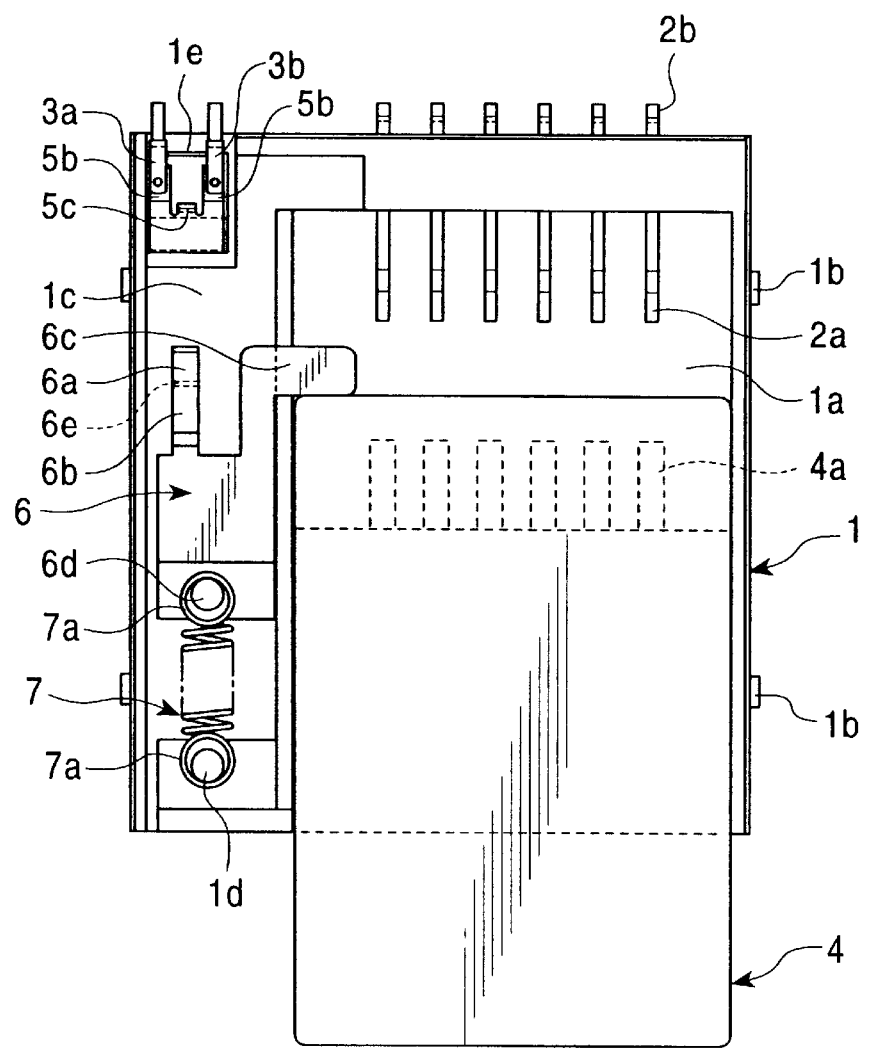
FIG. 17 is an explanatory view showing a state before a card is inserted.
Figure 18:
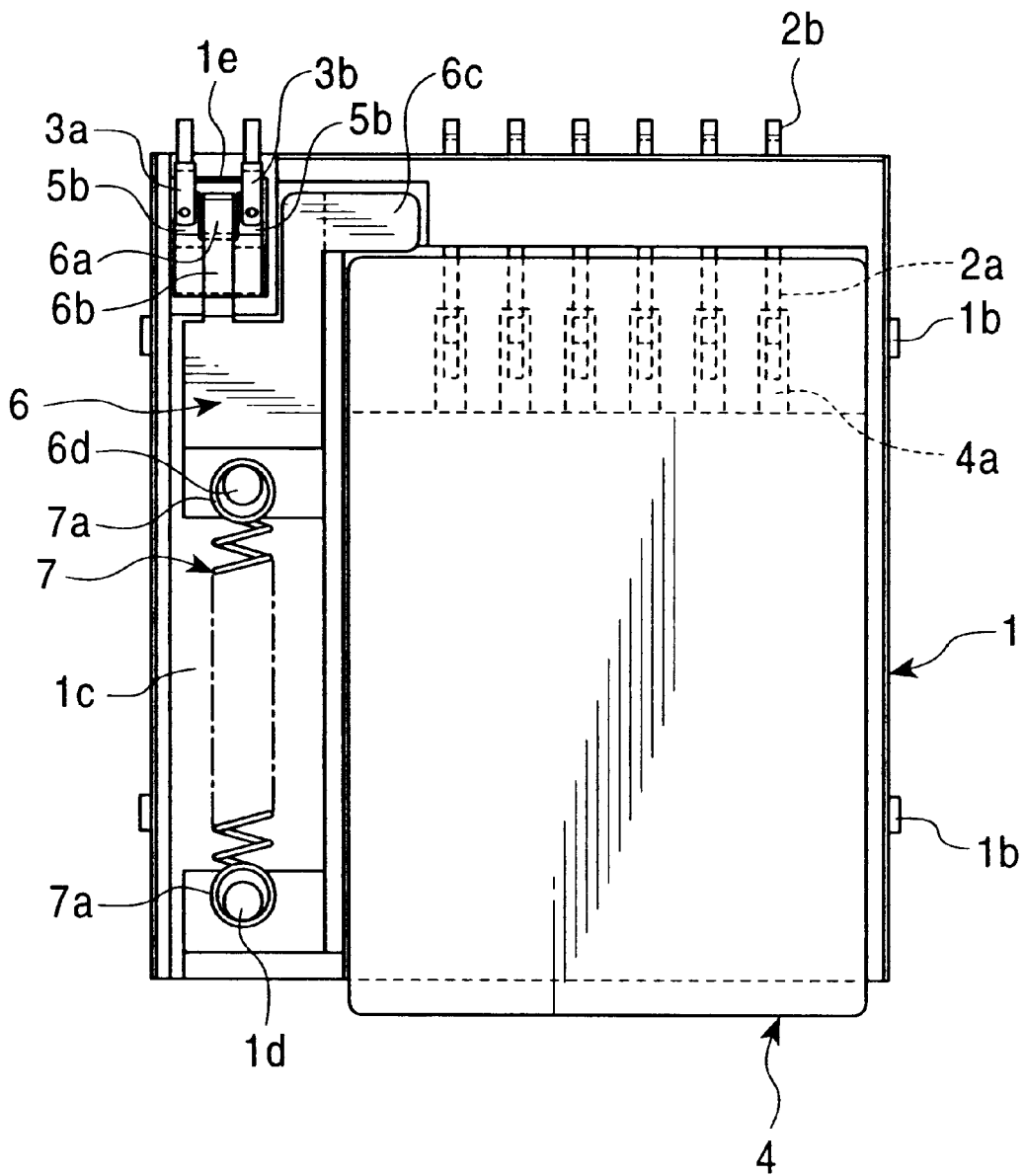
FIG. 18 is an explanatory view showing a state in which the card is loaded.

FIGS. 1 to 18 show an embodiment of the present invention. FIG. 1 is a plan view of a card connector device according to the embodiment of the present invention, FIG. 2 is a front view of the card connector device, FIG. 3 is a plan view of the card connector device from which a cover is removed, FIG. 4 is a sectional view taken along line IV—IV in FIG. 3, FIG. 5 is a plan view of a card, FIG. 6 is a side view of the card, FIG. 7 is an explanatory view showing a connecting state with contact terminals before a card is inserted, FIG. 8 is an explanatory view showing a connecting state with the contact terminals in which the card is loaded, FIG. 9 is a front view of a slide member, FIG. 10 is a side view of the slide member, FIG. 11 is a plan view of a pushrod, FIG. 12 is a side view of the pushrod, FIG. 13 is a plan view of a lock member, FIG. 14 is a side view of the lock member, FIG. 15 is a plan view of a detection switch section, FIG. 16 is a sectional view of the detection switch section mounted in a housing, FIG. 17 is an explanatory view showing a state before a card is inserted, and FIG. 18 is an explanatory view showing a state in which the card is loaded.

Referring to these figures, a housing 1 is made of an insulating material, such as synthetic resin, and is substantially shaped like a rectangle. The housing 1 has a storage section 1a in which a card 4, which will be described later, is inserted and stored. A plurality of contact terminals 2a made of a conductive metal are arranged at the inner bottom of the storage section 1a. The contact terminals 2a extend outside the housing 1 at one end so as to form connector terminals 2b which are connected to a circuit pattern of an external circuit board (not shown) or the like.

A plurality of engaging claws 1b are formed on the peripheral surface of the housing 1 so that they engage with a cover 9 which will be described later.

"At one end of the housing 1, a recessed portion 1c having a flat bottom face is connected to the storage section 1a and a slide member 6, which will be described later, is movably placed in the recessed portion 1c. The recessed portion 1c has a spring-retaining projection 1d for retaining a return spring 7, which will be described later, at its lower end, and a retaining groove 1e for retaining a lock member 5, which will be described later, at its upper end. First and second fixed contact portions 3a and 3b which constitute a detection switch section are arranged in parallel with a predetermined space therebetween at the upper end of the retaining groove 1e. A pushrod 8, which will be described later, is slidably guided on one side of the housing 1."

A card 4 has an integrated circuit (IC) stored therein, and is of the type which is widely used as a recording medium. A plurality of contact portions 4a are formed at one-end bottom of the card 4. The contact portions 4a are brought into contact with the contact terminals 2a formed in the storage section 1a of the housing 1, thereby exchange various information with an external,electronic device. FIGS. 7 and 8 show a state in which the card 4 is inserted in the housing 1 and the contact portions 4a of the card 4 are in contact with the contact terminals 2a.

A lock member 5 is made of an elastically deformable and conductive metal plate, such as a leaf spring, and is substantially U-shaped. The lock member 5 includes a flat base portion 5a to be retained by the retaining groove 1e of the housing 1, and a movable contact portion 5b formed by bending the flat base portion 5a into a U-shape and extending upward therefrom. The movable contact portion 5b is bifurcated into two leading end portions, and the leading end portions are placed, respectively, opposed to the first and second fixed contact portions 3a and 3b so as to move into contact with and away from the first and second fixed contact portions 3a and 3b.

An engagement receiving portion 5c is formed of a bent piece bent downward in a center cutout portion formed by the bifurcation. A hook-shaped engaging portion 6a of a slide member 6, which will be described later, engages with and disengages from the engagement receiving portion 5c. The engagement receiving portion 5c has an inclined face 5d which allows the slide member 6 to slide in the card-discharging direction. An inclined face 6e of the engaging portion 6a of the slide member 6 engages with the inclined face 5d.

In the lock member 5, the engaging receiving portion 5c which elastically deforms so as to engage with and disengage from the slide member 6, and the movable contact portion 5b which elastically deforms together with the engagement receiving portion 5c so as to move into contact with and away from the first and second fixed contact portions 3a and 3b are integrally formed. Therefore, a lock mechanism for the slide member 6 and a detection mechanism for detecting the locking can be combined into one piece. As a result, the number of components is reduced, the structure is simplified, and assembly efficiency is enhanced.

The lock member 5 includes the bifurcated movable contact portion 5b, and the center cutout portion formed by the bifurcation serves as the engagement receiving portion 5c. This makes it possible to reliably retain the engaging portion 6a of the slide member 6 with a simple structure.

A pair of fixed contact portions 3a and 3b and the bifurcated movable contact portion 5b disposed opposed thereto constitute a detection switch section. Therefore, even when the movable contact portion 5b tilts and elastically deforms, since the leading ends thereof are multiple contacts, a stable contact state is constantly maintained.

The slide member 6 is made of an insulating material such as synthetic resin, and has, at one-end, a retaining arm portion 6b with an engaging portion 6a which is to be engaged with the engagement receiving portion 5c of the lock member 5. The engaging portion 6a has an inclined face 6e which allows the slide member 6 to slide in the card-discharging direction. The inclined face 6e engages with the inclined face 5d formed in the engaging receiving portion 5c of the lock member 5.

The retaining arm portion 6b has, on the upper side, a first regulating face portion 6f which contacts an engagement regulating portion 8d of a pushrod 8, which will be described later, so as to regulate the upward movement of the engaging portion 6a, and a second regulating face portion 6g which is different in height from the first regulating face portion 6f and which allows the upward movement of the engaging portion 6a.

An L-shaped card contact portion 6c is formed by the side of the retaining arm portion 6b. The card contact portion 6c contacts the front end of the card 4 so that the slide member 6 can move in response to the insertion and discharging of the card 4.

At the other end of the slide member 6 opposite from the retaining arm portion 6b and the card contact portion 6c, a spring-retaining projection 6d is formed so as to retain one end of a below-described return spring 7 retained by the housing 1.

The slide member 6 is placed inside the housing 1 so that it can move upward and downward, that is, in the directions of insertion and discharging of the card 4, while being urged by the return spring 7.

The return spring 7 is formed of a coiled tension spring, and has a pair of catching portions 7a at both ends thereof. The catching portions 7a are laid around the spring-retaining projection 1d of the housing 1 and the spring-retaining projection 6d of the slide member 6, respectively, so as to urge the slide member 6 in the card-discharging direction.

The pushrod 8 is formed by bending a thin metal plate, and has a rectangular base portion 8a, and a pair of opposing operating pieces 8b formed by bending one end of the base portion 8a into a nearly U-shape. The distance between the operating pieces 8b is set to be equal to the distance between the leading end portions of the bifurcated movable contact portion 5b formed on the upper side of the lock member 5.

When the operating pieces 8b contact and press the movable contact portion 5b, the lock member 5 is elastically deformed and is bent downward so that the engagement receiving portion 5c of the lock member 5 and the engaging portion 6a of the slide member 6 are disengaged from each other.

An engagement regulating portion 8d shaped like a flat plate is formed between the operating pieces 8b. When the slide member 6 is held in a card loading position, the engagement regulating portion 8d contacts the first regulating face portion 6f of the slide member 6, and regulates the upward movement of the engaging portion 6a. During a card-discharging operation, the engagement regulating portion 8d allows the engaging portion 6a to be moved upward between the engagement regulating portion 8d and the second regulating face portion 6c by pushing the pushrod 8.

A pushbutton 8c to be pushed by a human finger or the like is formed at the other end of the base portion 8a. The pushrod 8 is built in the housing 1 together with the slide member 6, and moves inside the housing 1 while the base portion 8a is guided by the housing 1.

When the lock member 5 and the slide member 6 are disengaged from each other, as described above, the upper surface of the lock member 5 is pressed by one end of the pushrod 8, and is elastically bent downward so that the engaging portion 6a of the slide member 6 is disengaged from the engagement receiving portion 5c of the lock member 5. This simplifies the structure, and makes the discharging operation easy.

A cover 9 is made of a metal plate, and includes a top plate portion 9a shaped like a flat plate, and a side plate portion extending from the top plate portion 9a at right angles thereto and having a plurality of retaining windows (not shown) to be engaged with the engaging claws 1b of the housing 1. The cover 9 is mounted on the upper side of the housing 1 so as to cover an opening of the housing 1.

The detection switch section constituted by the fixed contact portions 3a and 3b and the bifurcated movable contact portion 5b is formed by opposing conductive metal plates. The fixed contact portions 3a and 3b and the movable contact portion 5b are placed with their leading ends connected (contacted) to each other. While the contact portions are placed in a normally closed (ON) state in this case, they may be initially placed in a normally open (OFF) state.

While the fixed contact portions 3a and 3b are connected (short-circuited) by the movable contact portion 5b so as to turn the switch on, one fixed contact portion and one movable contact portion may be (electrically) connected.

When the lock member 5 is elastically deformed downward by the movement of the slide member 6, the movable contact portion 5b of the lock member 5 is also elastically deformed downward, and the fixed contact portions 3a and 3b are disconnected, thereby turning the switch off. When the slide member 6 is then locked by the engagement receiving portion 5c of the lock member 5, the lock member 5 deformed downward returns into its initial state, and the movable contact portion 5b contacts the fixed contact portions 3a and 3b again, thereby turning the switch on. By detecting ON and OFF signals from the contacts at that time, it is detected that the card is locked in the loading position.

Next, operations of the above-described card connector device will be described with reference to FIGS. 17 to 25.

Figure 19:
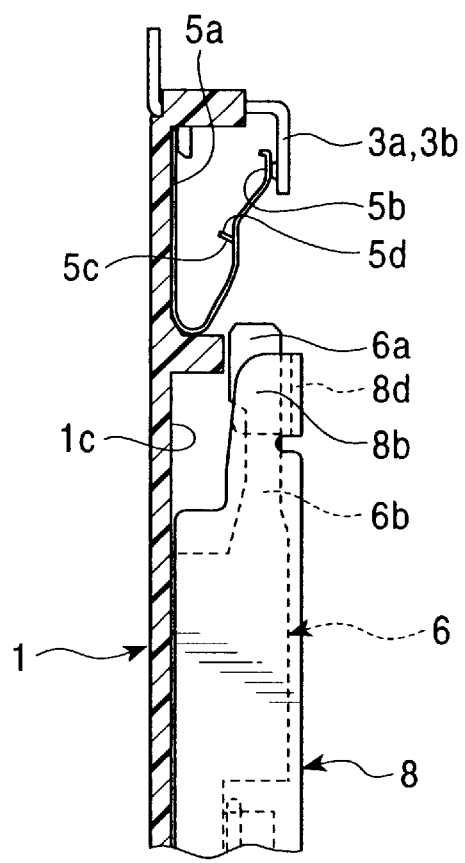
FIG. 19 is an explanatory view showing a state of the slide member and the lock member during the insertion of a card into the housing in the card connector device.
Figure 20:
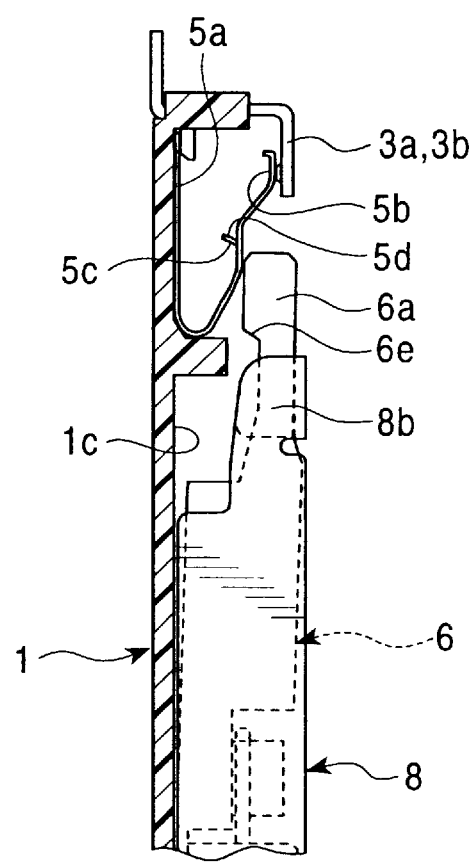
FIG. 20 is an explanatory view showing a state in which the detection switch section is turned off during the insertion of the card.
Figure 23:
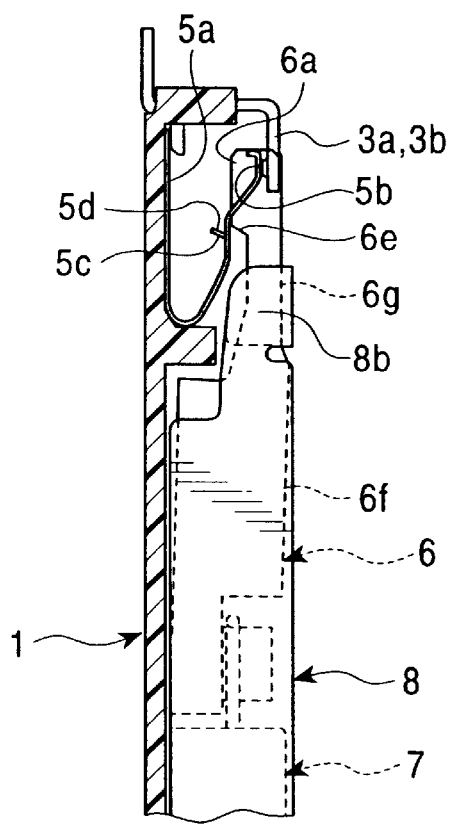
FIG. 23 is an explanatory view showing a state in which the slide member and the lock member are disengaged by pushing the pushrod.
Figure 24:
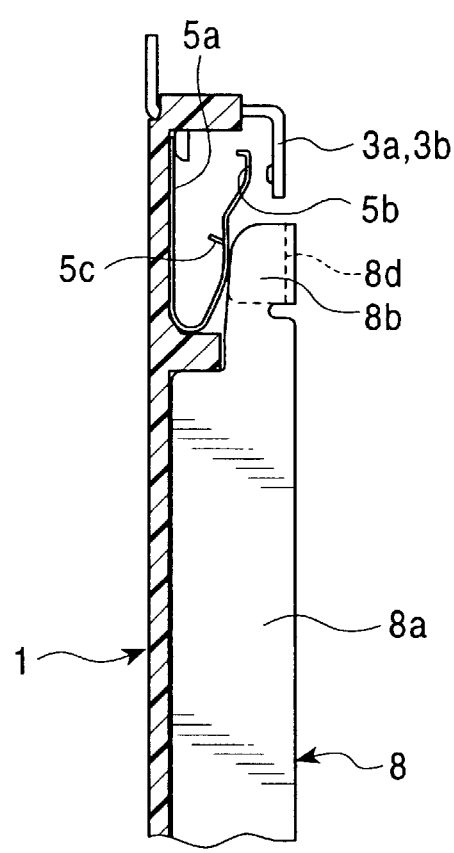
FIG. 24 is an explanatory view showing a state in which the unlocked slide member is returned and the card is being discharged.
Figure 25:
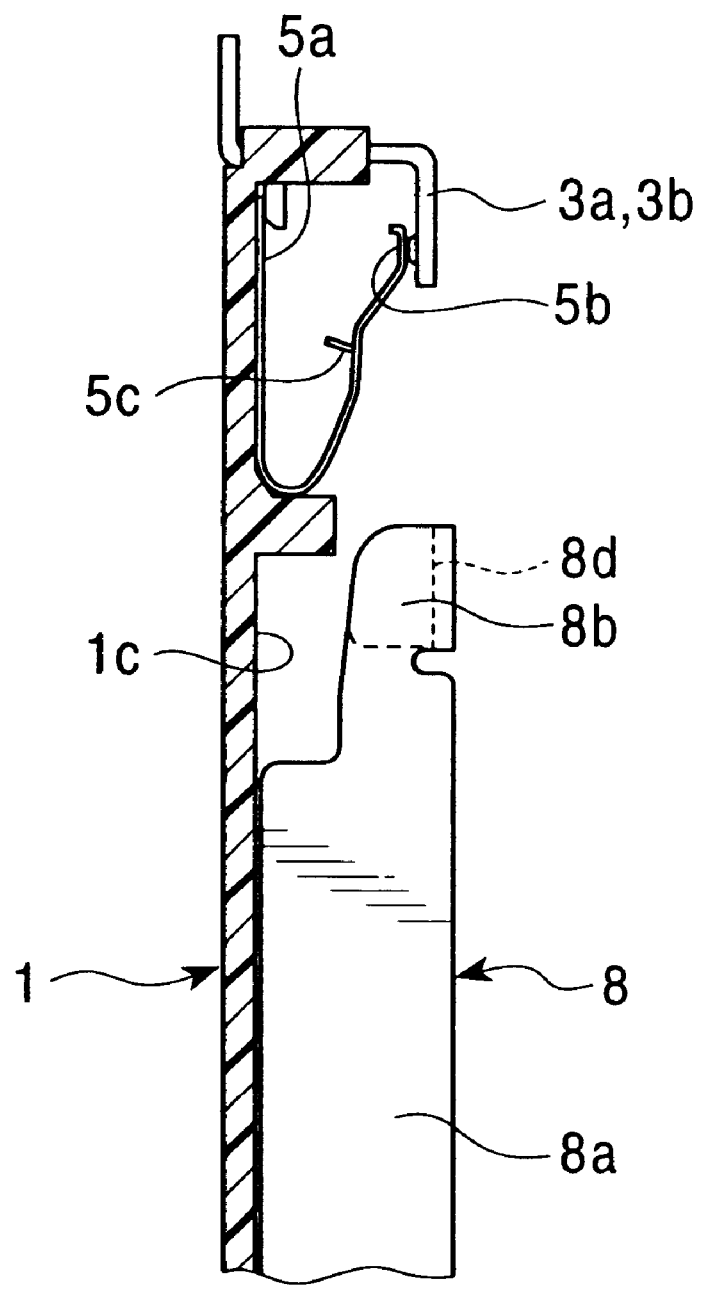
FIG. 25 is an explanatory view showing a state in which the pushrod returns to its initial position in response to the return of the slide member during the discharging of the card.

FIGS. 19 to 25 are explanatory views showing the states of engagement and disengagement of the slide member and the lock member in the card connector device of the present invention. FIG. 19 is an explanatory view showing a state in which a card is being inserted into the housing, FIGS. 20 and 21 are explanatory views showing a state in which the detection switch section is turned off during the insertion of the card, FIG. 22 is an explanatory view showing a locked state in which the slide member is engaged with the lock member, FIG. 23 is an explanatory view showing a state in which the slide member and the lock member are disengaged by pushing the pushrod, FIG. 24 is an explanatory view showing a state in which the unlocked slide member is returned and the card is being discharged, and FIG. 25 is an explanatory view showing a state in which the pushrod returns to its initial position in response to the return of the slide member during the discharging of the card.

First, the card 4 is inserted into the storage section 1a of the housing 1. Then, the card contact portion 6c of the slide member 6 contacts the front end of the card 4, and is pushed in the card-inserting direction (FIG. 17).

In response to the push of the card contact portion 6c in the card-inserting direction, the slide member 6 moves in the same direction against the urging force of the return spring 7. In this state, the engaging arm portion 6b of the slide member 6 is separate from the lock member 5, and the movable contact portion 5b of the lock member 5 and the fixed contact portions 3a and 3b are in contact with each other. Consequently, the detection switch section is in an ON state (FIG. 19).

When the card 4 is further pushed in the card-inserting direction against the urging force of the return spring 7, the slide member 6 moves in the same direction, and the leading end of the engaging arm portion 6b contacts the upper surface of the lock member 5 (FIG. 20).

Since the movable contact portion 5b is formed on the upper side of the lock member 5, when the engaging arm portion 6b presses the upper side of the lock member 5, the movable contact portion 5b is elastically deformed downward, and the leading ends thereof are separated from the fixed contact portions 3a and 3b. Therefore, the detection switch section is turned off (FIG. 21).

When the card 4 is further pushed in the card-inserting direction, the slide member 6 is also moved in the same direction, and the engaging portion 6a of the engaging arm portion 6b engages with the engagement receiving portion 5c of the lock member 5. Consequently, the slide member 6 is locked at that position (FIG. 22).

The engaging portion 6a and the engagement receiving portion 5c respectively have the inclined faces 6e and 5d which allow the slide member 6 to slide in the card-discharging direction, and the engaging portion 6a attempts to slide upward along the inclined faces 6e and 5d due to the urging force of the return spring 7 for urging the slide member 6 in the card-discharging direction. However, since the engagement regulating portion 8d formed at one end of the pushrod 8 contacts the first regulating face portion 6f of the slide member 6 so as to prevent the engaging portion 6a from moving upward, the engaged state is maintained.

Consequently, the slide member 6 is stopped, and the loading of the card 4 into the housing 1 is completed. In this case, the contact portions 4a of the card 4 and the contact terminals 2a of the housing 1 are in contact with each other (FIG. 18).

Since the engagement receiving portion 5c of the lock member 5 is engaged with the engaging portion 6a of the engaging arm portion 6b in this state, the movable contact portion 5b formed on the upper side of the lock member 5 returns upward because of its elasticity, and the leading ends thereof contact the fixed contact portions 3a and 3b. Consequently, the detection switch section is turned on (FIG. 22).

In the above configuration, the lock member 5, which locks the slide member 6 in the card loading position when the slide member 6 is moved to that position by the insertion of the card, is formed of an elastically deformable metal leaf spring. The movable contact portion 5b of the leaf spring is elastically deformed by the engaging arm portion 6b of the slide member 6. Therefore, the detection switch section is actuated when the engaging portion 6a of the engaging arm portion 6b engages with the engagement receiving portion 5c of the lock member 5. This makes it possible to reliably detect whether or not the card is locked in the loading position.

Since the lock member 5 is formed of an elastically deformable leaf spring and also functions as the movable contact portions 5b, the number of components is decreased, the structure is simplified, and the size of the card connector device is reduced.

In order to discharge the card 4 loaded in the housing 1, the pushrod 8 is moved in the card-inserting direction by pushing the pushbutton 8c of the pushrod 8 placed in a standby position with a finger or the like in a state in which the card 4 is loaded (FIG. 18). The engagement regulating portion 8d formed at one end thereby separates from the first regulating face portion 6f of the slide member 6, and moves onto the second regulating face portion 6g which is different in height from the first regulating face portion 6f.

When the regulation by the engagement regulating portion 8d is removed, the engaging portion 6a of the slide member 6 is caused, by the urging force in the card-discharging direction of the return spring 7, to slide upward along the inclined face 6e engaged with the engagement receiving portion 5c of the lock member 5. Consequently, the engaging portion 6a of the slide member 6 disengages from the engagement receiving portion 5c of the lock member 5 (FIG. 23).

In this case, the engaging portion 6a of the slide member 6 and the engagement receiving portion 5c of the lock member 5 have the inclined faces 6e and 5d which allow the slide member 6 to slide in the card-discharging direction. Since the inclined faces 6e and 5d are formed at the engaging portion, even when a card-discharging operation is repeated, the leading ends of the engaging portion 6a and the engagement receiving portion 5c will not be worn down and rounded due to the sliding, and reliable locking is ensured. Accordingly, a highly durable lock mechanism is achieved.

The pushrod 8 has the engagement regulating portion 8d, and the slide member 6 has the first regulating face portion 6f which contacts the engagement regulating portion 8d so as to regulate the upward movement of the engaging portion 6a, and the second regulating face portion 6g which is different in height from the first regulating face portion 6f and allows the upward movement of the engaging portion 6a. Accordingly, a lock mechanism having a simple structure can be achieved without adding other components. Moreover, the locking can be easily released with a simple operation of pushing the pushrod 8.

When the pushrod 8 is further pushed, the operating pieces 8b contact and press the upper side of the lock member 5, and elastically deform the lock member 5 downward. The engagement receiving portion 5c of the lock member 5 is thereby completely separated from the engaging portion 6a of the slide member 6. In this case, the movable contact portion 5b also separates from the fixed contact portions 3a and 3b, and the detection switch section is turned off (FIG. 24).

Then, the slide member 6 is moved in the card-discharging direction by the urging force of the return spring 7. Since the base portion 8a of the pushrod 8 is made of an elongated thin metal plate at one end, as shown in FIG. 3, it will not interfere with the movement of the slide member 6.

With the movement of the slide member 6 in the card-discharging direction, the card 4 is also moved in the same direction. In this case, the contact portions 4a of the card 4 and the contact terminals 2a of the housing 1 are disconnected (FIG. 17).

Next, when the push of the pushrod 8 is removed, the pushrod 8 returns to its initial standby position because of the urging force of a coil spring or the like (not shown), so that the initial state is brought about (FIG. 25).

In the above-described invention, as the lock mechanism, the engaging portion 6a of the slide member 6 and the engagement receiving portion 5c of the lock member 5 are loosely engaged in such a direction that they disengage from each other. Moreover, the engagement regulating portion 8d is added in order to regulate the engagement between the slide member 6 and the lock member 5 and to maintain the engagement between the engaging portion 6a and the engagement receiving portion 5c.

By removing the regulation by the engagement regulating portion 8d, the engaging portion 6a moves in such a direction that it separates from the engagement receiving portion 5c, and the slide member 6 and the lock member 5 are disengaged from each other. Thus, reliable locking is made possible by the engagement regulating portion 8d, and the engaging portion 6a and the engagement receiving portion 5c are loosely engaged. This allows the lock mechanism to be highly durable.

While the lock member 5 is formed of a U-shaped metal leaf spring in the above embodiment, of course, it may be an L-shaped, arc-shaped, or flat spring member as long as the movable contact portion 5b can elastically deform.

While the present invention has been described with reference to what is presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A card connector device comprising:
    a slide member which slides in a card-inserting direction and a card-discharging direction of a card to be loaded in and unloaded from a housing;
    a return spring for urging said slide member in the card-discharging direction;
    a lock member for holding said slide member at a card-loading position, where said card is loaded, against urging force of said return spring, said lock member having an engagement receiving portion and being formed by bending an elastically deformable metal plate; and
    a releasing member for unlocking said lock member,
    wherein said slide member has an engaging portion to be engaged with said engagement receiving portion of said lock member, said engaging portion has an inclined face inclined in the card-inserting and card-discharging directions, and said slide member diagonally moves along said inclined face when said engaging portion disengages from said engagement receiving portion,
    wherein said releasing member is a pushrod disposed movably in the card-inserting direction, and said pushrod has an engagement regulating portion that regulates the upward movement of said slide member along said inclined face when said engaging portion disengages from said engagement receiving portion,
    wherein, in a state in which the card is loaded and said engaging portion and said engagement receiving portion are engaged with each other, said engagement regulating portion regulates the upward movement of said slide member so that said slide member is held in the card-loading position against the urging force of said return spring, and
    wherein, when the regulation of the upward movement of said slide member by said engagement regulating portion is removed by pushing said pushrod in the card-inserting direction, said engaging portion disengages from said engagement receiving portion, and said slide member is moved in the card-discharging direction by the urging force of said return spring to discharge the card.

2. A card connector device according to claim 1, wherein said slide member includes a first regulating face portion and a second regulating face portion that are different in height, the upward movement of said slide member is regulated, and the engagement of said engaging portion and said engagement receiving portion is maintained when said engagement regulating portion of said pushrod is brought into contact with said first regulating face portion in the state in which said engaging portion and said engagement receiving portion are engaged with each other, and the upward movement of said slide member is allowed and said engaging portion is disengaged from said engagement receiving portion when said engagement regulating portion is moved onto said second regulating face portion by pushing said pushrod.

3. A card connector device according to claim 1, wherein said housing has a fixed contact portion to be movable into contact with and away from said lock member, the presence or absence of the card is detected in response to the movement of said fixed contact portion into contact with or away from said lock member with the movement of said slide member.

* * * * *